May 3, 1932.　　　　　T. ZERBI　　　　　1,856,529
PROPELLER HUB FOR AIRCRAFT ENGINES WITH A REDUCING
GEAR OF THE SUN AND PLANET WHEEL TYPE
Filed May 28, 1930

Inventor,
Tranquillo Zerbi,
By Henry Orth
Atty.

Patented May 3, 1932

1,856,529

UNITED STATES PATENT OFFICE

TRANQUILLO ZERBI, OF TURIN, ITALY, ASSIGNOR TO FIAT SOCIETÁ ANONIMA, OF TURIN, ITALY

PROPELLER HUB FOR AIRCRAFT ENGINES WITH A REDUCING GEAR OF THE SUN AND PLANET WHEEL TYPE

Application filed May 28, 1930, Serial No. 456,465, and in Italy August 31, 1929.

It is known that constantly increased power with reduced weight and size are demanded from modern aircraft engines, which necessitates the use of high-speed engines. Limits are however put, for several reasons, to the propeller speed and it is therefore necessary to provide high-speed engines with reducing gears for transmitting motion to the propeller.

Such reducing gears are generally open to the objection that they considerably increase the length of the engines, besides other minor disadvantages depending upon the type of reducing gear employed.

This invention relates to a unit comprising a propeller hub for aircraft engines and a reducing gear of the sun and planet wheel type which is co-axially arranged to the engine shaft. This hub supports the propeller blades and carries the planet wheels. A cap is fitted on the hub and encloses said unit.

The accompanying drawings show by way of example a constructional form of the object of this invention.

Figure 1:
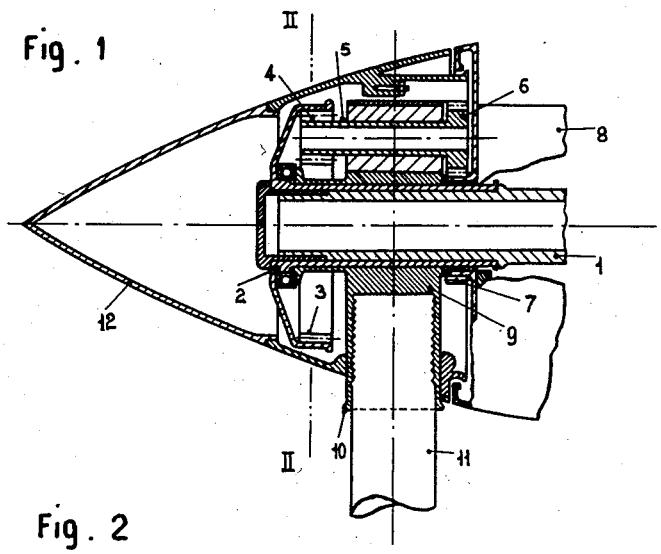
Figure 1 is an axial section.
Figure 2:
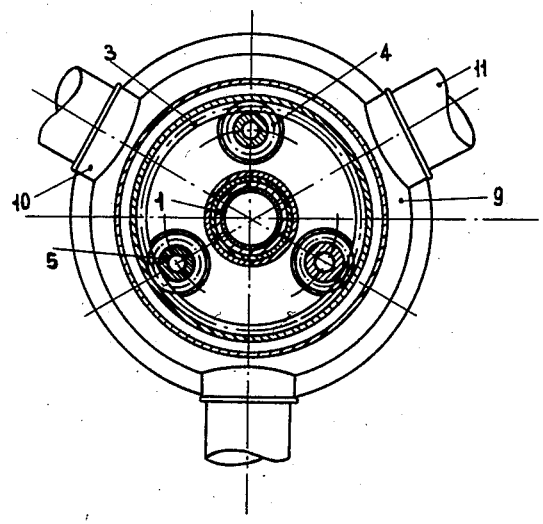
Figure 2 is a cross section on line II—II of Fig. 1.

To the engine shaft 1 is keyed a sleeve 2 carrying an internally toothed rim 3 integral or attached thereto. The rim 3 meshes with the planet wheels 4 fast with the spindles 5 carrying at their other ends toothed pinions 6 meshing with a toothed wheel or rim 7 secured to the engine casing 8.

The spindles 5 to which the pinions 4 and 6 are keyed are rotatably mounted on bearings carried by a hub 9 which they traverse on its whole length.

The rotation of the engine shaft 1 is thus transmitted through the toothed rim 3, pinions 4 and 6 and toothed wheel 7 to the hub 9 at a rate determined by the ratio between the number of teeth of the gearings mentioned above.

Sleeves or projections 10 are fast with the hub 9 and carry the propeller blades 11.

The above described mechanism is compactly arranged and of a diameter slightly larger than that of an ordinary propeller hub, the length being substantially equal; the whole is protected and enclosed in a cap 12 of suitable streamline form.

What I claim is:

1. Propeller hub for aircraft comprising, in combination with a propeller shaft on which said hub is directly and loosely mounted, a support for said shaft, spindles rotatably mounted in longitudinal holes in the hub and projecting from said hub at both ends, toothed wheels keyed at one end of said shafts and meshing with a toothed rim keyed on said propeller shaft, and toothed wheels on the other ends of said spindles adapted to mesh with a fixed toothed wheel carried by the support of said propeller shaft.

2. In an aircraft propelling unit, an engine having a crank shaft, an annular gear fixed with respect to the engine and encircling the crank shaft, a propeller comprising blades extending substantially radially with respect to the crank shaft, said blades being mounted on a hub rotatably secured on said crank shaft, an internally toothed ring gear secured on said shaft in radially spaced relation thereto, a spindle rotatably mounted in an opening in the hub and protruding therefrom at both ends, a planetary pinion fixedly secured on one end of said spindle and engaging the ring gear, said pinion being disposed in the space between the ring gear and crank shaft and a second pinion fixedly secured on the opposite end of the spindle and engaging the fixed annular gear.

In testimony that I claim the foregoing as my invention, I have signed my name.

TRANQUILLO ZERBI.